United States Patent [19]

Falk

[11] Patent Number: 4,947,170
[45] Date of Patent: Aug. 7, 1990

[54] ALL OPTICAL ANALOG-TO-DIGITAL CONVERTER

[75] Inventor: R. Aaron Falk, Renton, Wash.

[73] Assignee: The Boeing Company, Seattle, Wash.

[21] Appl. No.: 209,933

[22] Filed: Jun. 22, 1988

[51] Int. Cl.[5] .......................... H03M 1/12; G02F 7/00
[52] U.S. Cl. .................................... 341/137; 350/96.14
[58] Field of Search ..................... 341/137; 350/96.12, 350/96.13, 96.14, 96.34; 356/345

[56] References Cited

U.S. PATENT DOCUMENTS

| | | | |
|---|---|---|---|
| 4,147,979 | 4/1979 | Baues et al. | 350/96.13 |
| 4,431,263 | 2/1984 | Garito | 350/95.34 |
| 4,536,450 | 8/1985 | Garito | 350/96.34 |
| 4,609,252 | 9/1986 | Wong et al. | 350/96.34 |
| 4,626,075 | 12/1986 | Chemla | 350/96.14 |
| 4,775,215 | 10/1988 | Teng et al. | 350/96.34 |
| 4,786,129 | 11/1988 | Webb | 356/345 |
| 4,787,714 | 11/1988 | Greene et al. | 350/96.13 |

Primary Examiner—William M. Shoop, Jr.
Assistant Examiner—H. L. Williams
Attorney, Agent, or Firm—Foley & Lardner, Schwartz, Jeffery, Schwaab, Mack, Blumenthal & Evans

[57] ABSTRACT

A fully optical A/D converter is disclosed in which the difference in light intensity from two outputs of a two-arm interferometer in each channel is detected. The difference in light intensity is varied in accordance with a phase shift in the light passing through one arm of the interferometer. The phase shift is accomplished by the use of a non-linear optical material, the optical properties of which are altered based on the characteristics of an input optical signal to be digitized. Thus, the difference in light intensity corresponds to the magnitude of the input optical signal.

21 Claims, 5 Drawing Sheets

ALL OPTICAL ANALOG-TO-DIGITAL CONVERTER

BACKGROUND OF THE INVENTION

The invention relates generally to analog-to-digital (A/D) converters. More specifically, the invention relates to a fully optical A/D converter.

Many inputs provided to digital data processing systems are derived from signals that are typically analog in nature. The first step in processing an analog signal in a digital data processing system is, of course, to perform an A/D conversion. It is well known for a bandwidth limited signal with a sharp cutoff upper limit frequency of (f), an A/D converter must sample the signal at a rate of at least (4 f). For high frequency signals, such as in microwave communications and radar, the necessary sampling rates (bandwidths) cannot be achieved using electronic techniques.

Recently, electro-optic devices with gegahertz (GHz) sampling rates have been proposed and demonstrated. For example, U.S. Pat. 4,502,037 discloses an electro-optic A/D converter that employs a two-armed interferometer, in which the intensity of the emergent radiation is a function of a phase shift introduced by the application of a potential difference, representing the signal to be digitized, between electrodes positioned in the vicinity of at least one arm of the interferometer.

The basic theory of operation of such electro-optic A/D devices is described in detail by Becker and Leonberger in a paper entitled, "Performance Criteria of Components Required for Electrooptic Analog-to-Digital Conversion", Proceedings of SPIE, Vol. 408, Integrated Optics III, pp. 50–56 (1983), incorporated herein by reference. This paper discusses an electro-optic A/D in which high speed sampling is derived from the use of a pulsed laser source. For example, laser diodes can be used to obtain pulses of a few tens of picoseconds with GHz repetition rates. As shown in FIG. 1, the light from the pulsed laser source is introduced into an integrated optics device which consists of a multiplicity of Mach-Zehnder modulators. The electrodes of the modulators are driven electronically in parallel by the signal to be digitized. The output intensity, $I_o$, of the modulator in response to the drive voltage, V, is given by $$I_o = I_i \cos^2(2\pi a\, VL) \qquad (1)$$

where $I_i$ is the input intensity, L is the length of the electrodes and $a$ is the electro-optic coupling coefficient with a typical value of 0.1 $(V\text{-cm})^{-1}$. As shown in FIG. 1 the output intensity, $I_o$, is detected and compared to a reference channel so as to turn on the digital output when $I_o$ is equal to $\tfrac{1}{2} I_i$. Through the use of suitable bias voltages and differing electrode lengths it is possible to arrange the thresholds to occur in a pattern that produces a gray code output, a variation on binary encoding.

A fundamental difficulty with the above-described electro-optic A/D devices is that higher frequency operation can only be achieved at the expense of digitizing resolution. At high frequencies, the voltage applied to the electrodes of the modulator does not travel down the electrodes at the same velocity as the light pulse travelling though the waveguide. Typically, the light will travel twice as fast, causing the light pulse to smear out (average over) the input signal which in turn produces an error in digitalization of the signal. For a particular input frequency, f, the worse case error (sampling at the peak or trough) is given approximately by $$\epsilon \simeq 2\pi f L \left( \frac{1}{V_e} - \frac{1}{nc} \right) \qquad (2)$$

where c is the speed of light, n is the index of refraction of the material, $V_e$ is the speed of the electrical signal down the electrodes and L is the electrode length. This error implies a maximum bit resolution, $B_r$, given by $$B_r = \log_2 \left| \frac{1}{\epsilon} \right| = 1.44 \ln \left| \frac{1}{\epsilon} \right| \qquad (3)$$

Note that the above analysis is for a single frequency signal, but the analysis for real bandwidth limited signals is quite similar.

If the length of the electrodes could be arbitrarily shortened, the "walk-off" phenomena described above would not be a problem. Unfortunately, the resolution of the device is also limited by the number of cycles of the cosine function in Equation 1 for the lowest order bit channel. A typical device can at best withstand about 100 volts without breaking down. Using 100 volts as the maximum voltage, $V_m$, it can be shown that the drive voltage bit resolution is given by $$B_v = 1.44 \ln(2aV_m L) = 1.44 \ln(20L) \qquad (4)$$

A plot of Equations 3 and 4 is shown in FIG. 2. The intersection of the two curves gives the maximum bit resolution at a particular frequency. As can be seen, bit resolution is extremely limited for frequencies higher than about 3 GHz.

SUMMARY OF THE INVENTION

The present invention overcomes the deficiencies of the electro-optic A/D converters discussed above by providing a fully optical A/D converter having the potential for picosecond sampling rates.

More specifically, the present invention detects the difference in light intensity from two outputs of a two-arm interferometer. The difference in light intensity is varied in accordance with a phase shift in the light passing through one arm of the modulator. The phase shift is accomplished by the use of a non-linear optical material, the optical properties of which are altered based on the characteristics of an input optical signal to be digitized. Thus, the difference in light intensity between the two outputs of the interferometer corresponds to the magnitude of the input optical signal.

BRIEF DESCRIPTION OF THE DRAWINGS

Reference should be made to the following drawings for an understanding of the background of the invention presented above and a more detailed description of the invention in which.

DETAILED DESCRIPTION OF THE PREFERRED EMBODIMENTS

Figure 1:
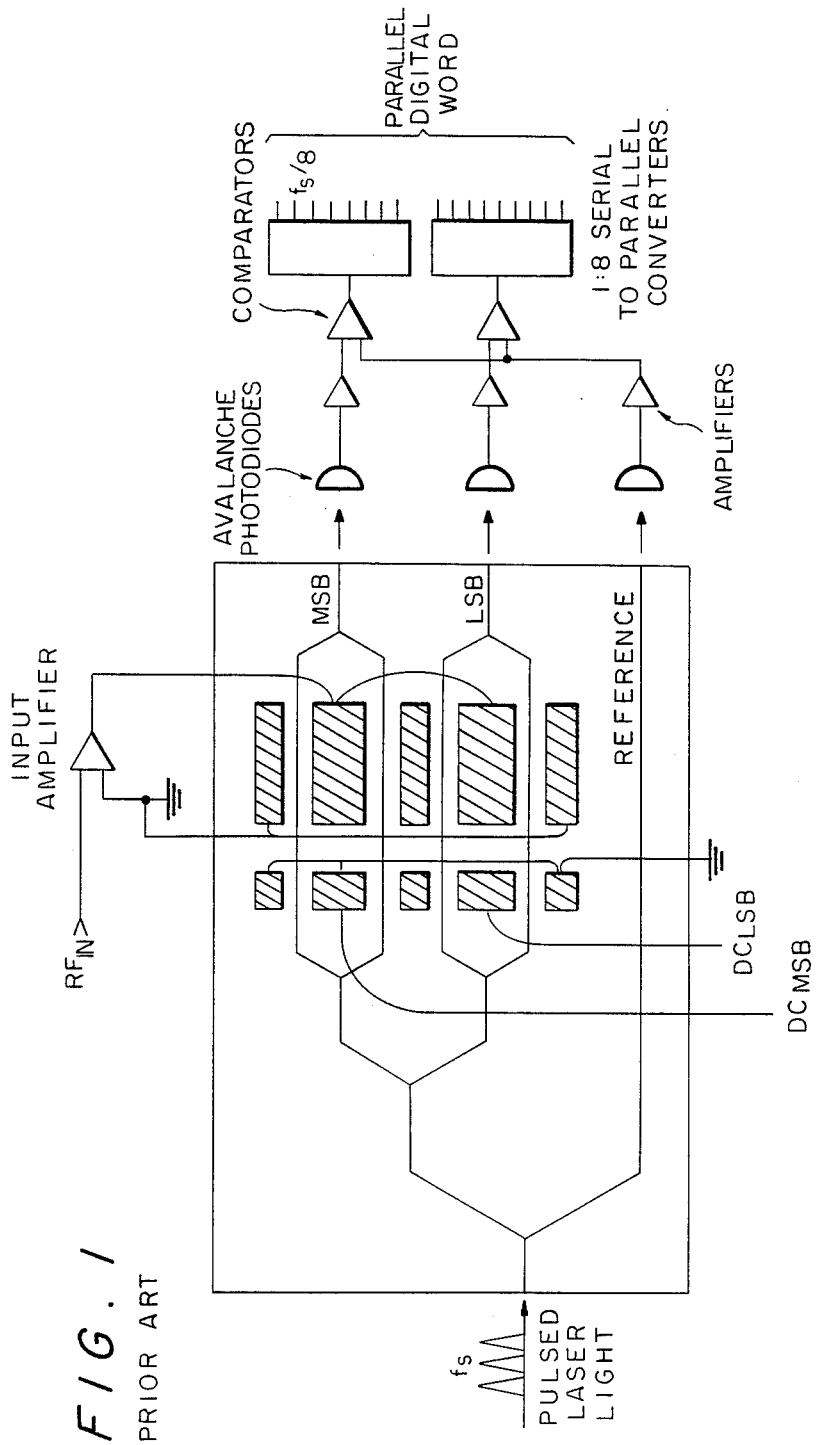
FIG. 1 illustrates a prior art electro-optic A/D converter.
Figure 2:
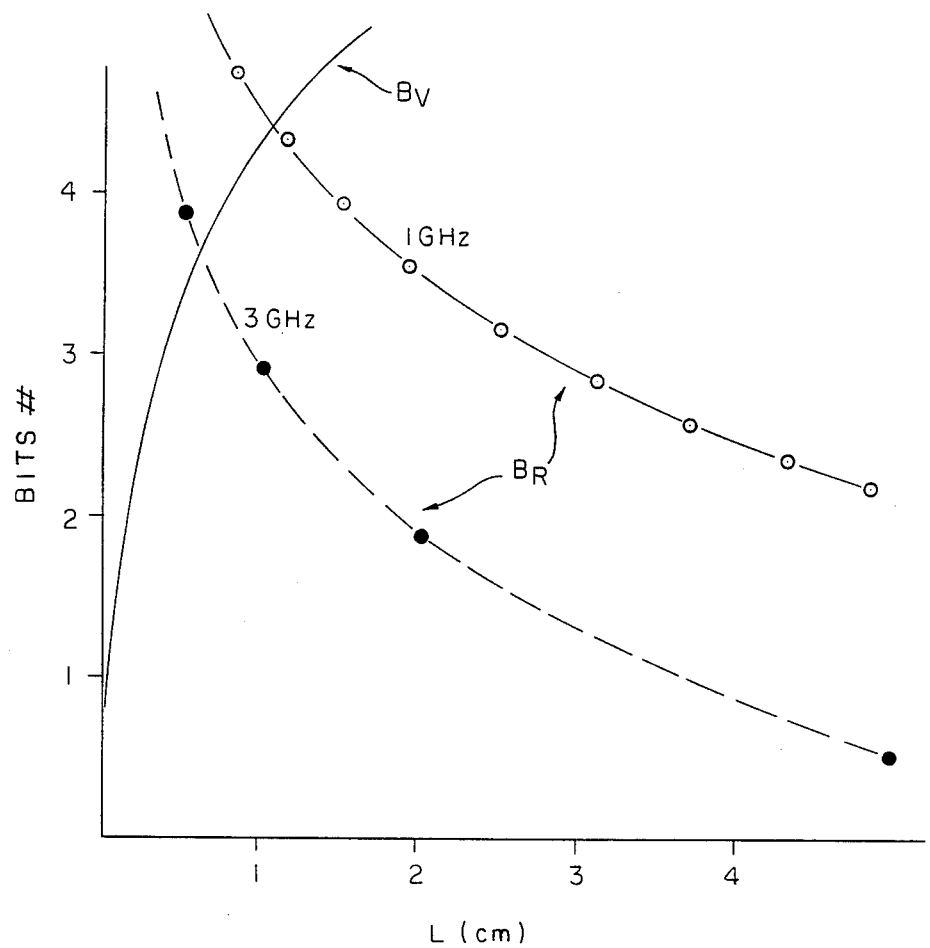
FIG. 2 is a graph illustrating the bit resolution limits for the A/D converter shown in FIG. 1.
Figure 3:
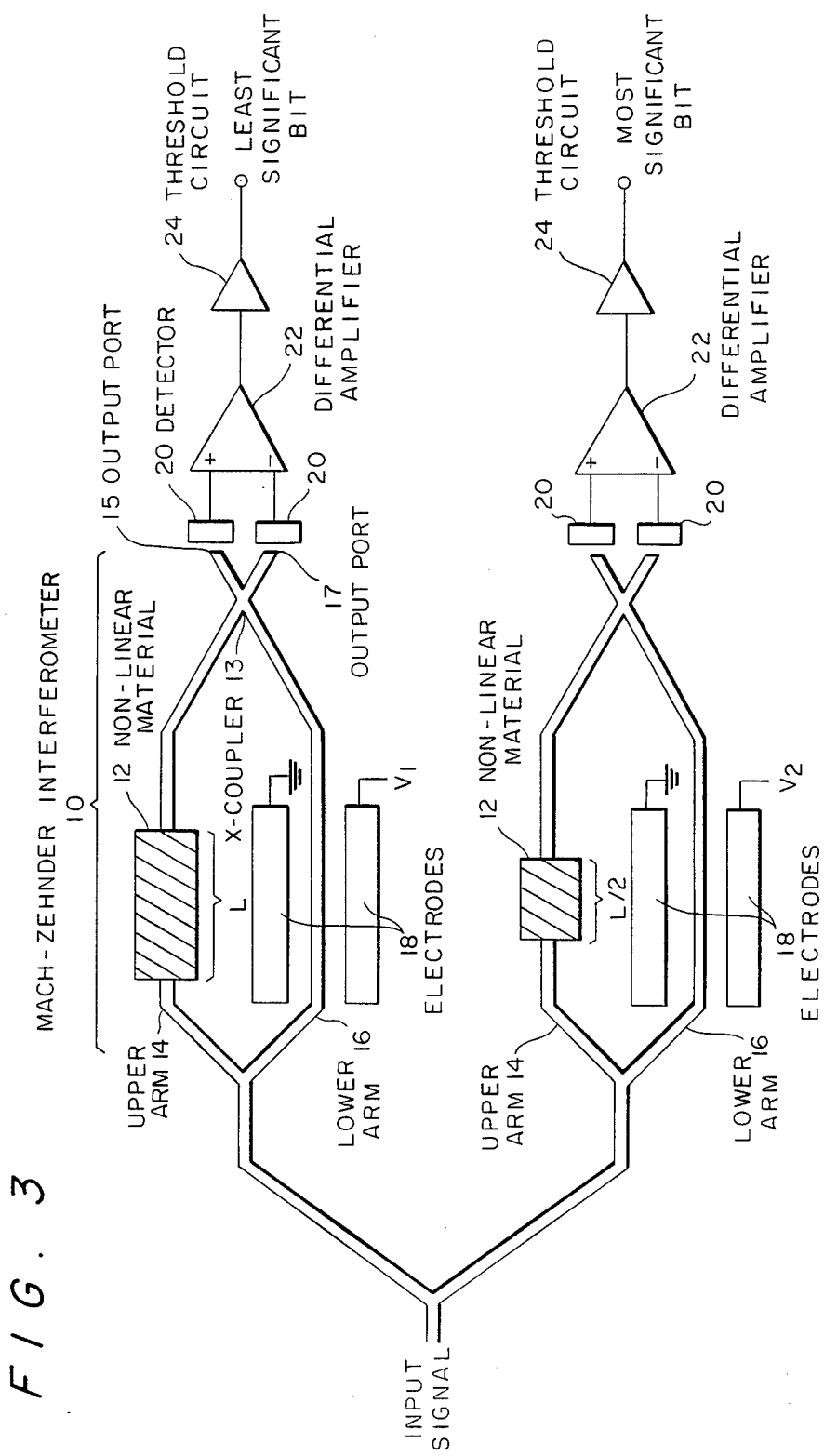
FIG. 3 illustrates a first embodiment of a fully optical A/D converter according to the present invention.

Referring now to FIG. 3, a fully optical two-channel A/D in accordance with a first embodiment of the present invention is shown having a two output Mach-Zehnder interferometer 10 (as described, for example, by Izutsu et al, "Optical-Waveguide Hybrid Coupler", *Optics Letters*, Nov. 1982, Vol. 7, No. 11) for each of two channels. The input signal to be digitized is brought in on an input light beam.

Figure 4:
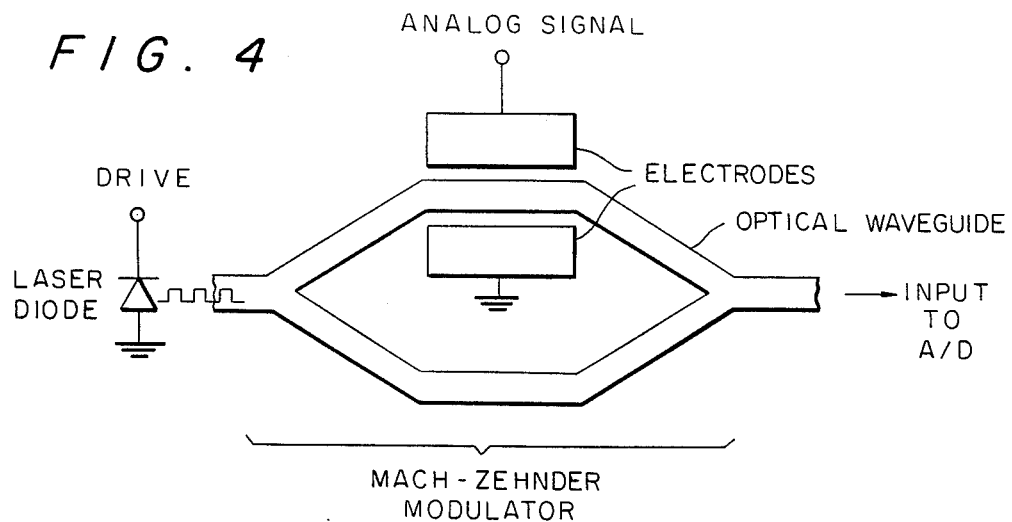
FIG. 4 illustrates a pulse modulation device that may be used to generate the optical input signal provided to the A/D converter illustrated in FIG. 3.

In most A/D devices it is desirable to integrate the response over the sampling period so as to avoid having the bits switching during a sample period, i.e., a clean bit stream is desired without switching in the middle of the bits. Electronically, this function is typically performed by a sample and hold circuit. Optically, this function can be accomplished by using short pulses in the input channel and imposing the analog signal onto the pulse train. For example, as shown in FIG. 4, a pulse train can generated by a laser diode and the analog signal to be digitized applied to the electrodes of a Mach-Zehnder modulator. The optical output is then supplied to the A/D converter.

In order to cause a change in the output of the interferometers 10 in response to changing input light intensity, a non-linear optical material 12, whose index of refraction is dependent on the intensity of light, is introduced into an upper arm 14 of each interferometer 10. The material could either be imbedded into the waveguide of the upper arm 14 (for example, a multi-quantum well structure built into a Group III–V semiconductor waveguide) or could be laid on top of the waveguide with the light coupling into the material via the evanescent field from the waveguide (for example, non-linear organic materials such as polydiacetylene laid over $LiNbO_3$ waveguides).. The purpose of the non-linear optical material 12 is to introduce an intensity dependent phase shift into one arm of the interferometer. The light passing through the upper and lower arms 14 and 16 of the interferometers 10 is combined by an X-coupler 13 such that the output signals from upper and lower output ports 15 and 17 are given respectively by:

$$I_u = (S+B) \cos^2 (2\pi\beta(S+B) L + \phi) \quad (5)$$

and $$I_L = (S+B) \sin^2 (2\pi\beta(S+B) L + \phi) \quad (6)$$

where $\phi$ is a phase offset adjusted by electrodes 18 provided in the lower arms 16 of the interferometers 10, S is the input signal light level, B is a bias light level used to remove the ambiguity at zero signal, L is the length of the non-linear optical material 12 and $\beta$ is the non-linear coefficient.

The output signals from the upper and lower output ports 15 and 17 of each of the interferometers 10 are provided to detectors 20 and the difference between the output signals for each channel is then determined by a differential amplifier 22 yielding the difference signal $$I_u - I_L = (S+B) \cos (4\pi\beta SL + (4\pi\beta BL + 2\phi)) \quad (7)$$

Figure 5:
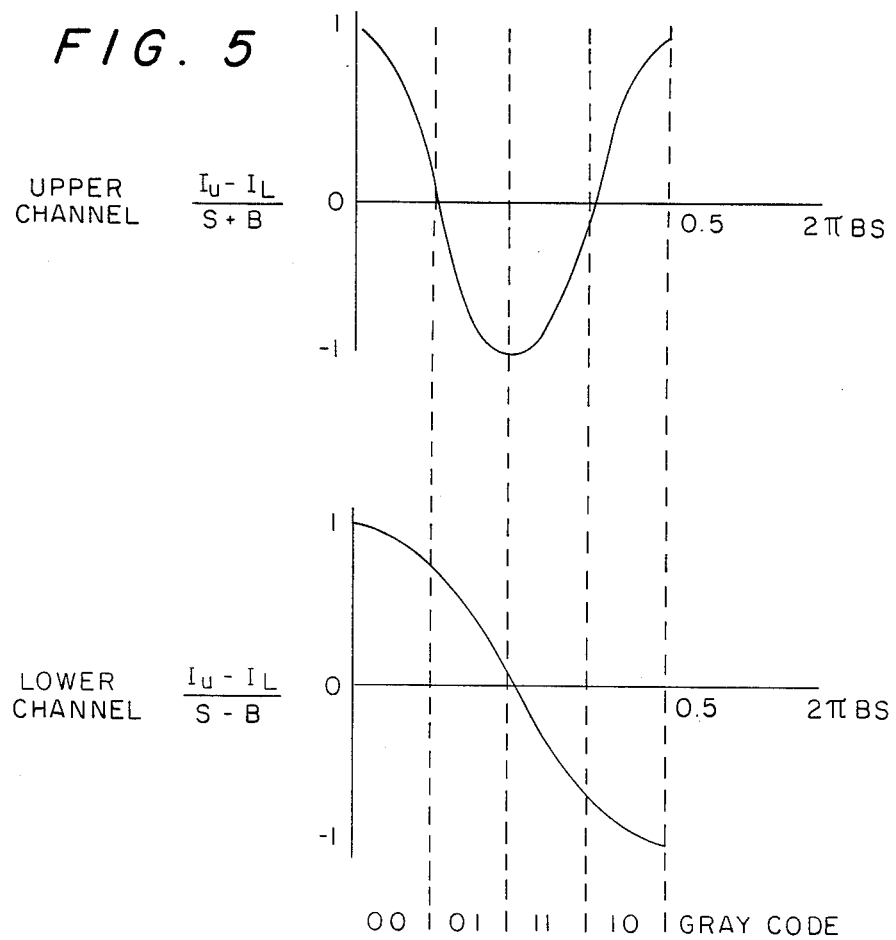
FIG. 5 is a graph illustrating the output from the fully optical A/D converter illustrated in FIG. 3.

The first term in the cosine function in Equation 7 is proportional to the input signal and the second is simply a phase offset. Several choices of the bias, interaction length, L, and phase offset are possible. For example, the two bit device shown in FIG. 3 has an upper channel (lowest order bit) with an interaction length of twice the lower channel (highest order bit). Given some finite value of B and that the phase term in Equation 7 is adjusted to be zero in both channels, then the normalized difference signals are as shown in FIG. 5. If the threshold circuits 24 shown in FIG. 3 are set to switch on when the difference signal is negative, then the gray code output seen at the bottom of FIG. 5 results. Extension to more bits can be performed by simply adding additional channels with interaction lengths of half that of the proceeding channel.

As the non-linear interaction takes place only during the time the light is present, the "walk-off" problem found in electro-optic A/D converters does not occur. Also, typical non-linear materials respond in picoseconds so that temporal resolution will not be a problem until the frequencies are very large. Given typical materials values of non-linearity of $10^{-4}$ esu input powers of $10^{-4}$ watts and typical waveguide structures, it can be shown that a 1 cm interaction length for the lowest order bit channel would allow 10 bits of resolution.

Finally, it should be noted that although Mach-Zehnder interferometers are used in the embodiment of FIG. 3, this is not the only possible choice. Any interferometer that has dual outputs with complimentary, periodic behavior can be utilized. For example, the X-crossing and extended X modulators described by Neyer et al in the article entitled "A Beam Propagation Method Analysis of Active and Passive Waveguide Crossings", *Journal of Lightwave Technology*, Vol. LT-3, No. 3, June 1985, could be used given that the non-linear material was suitably incorporated into the structure.

Figure 6:
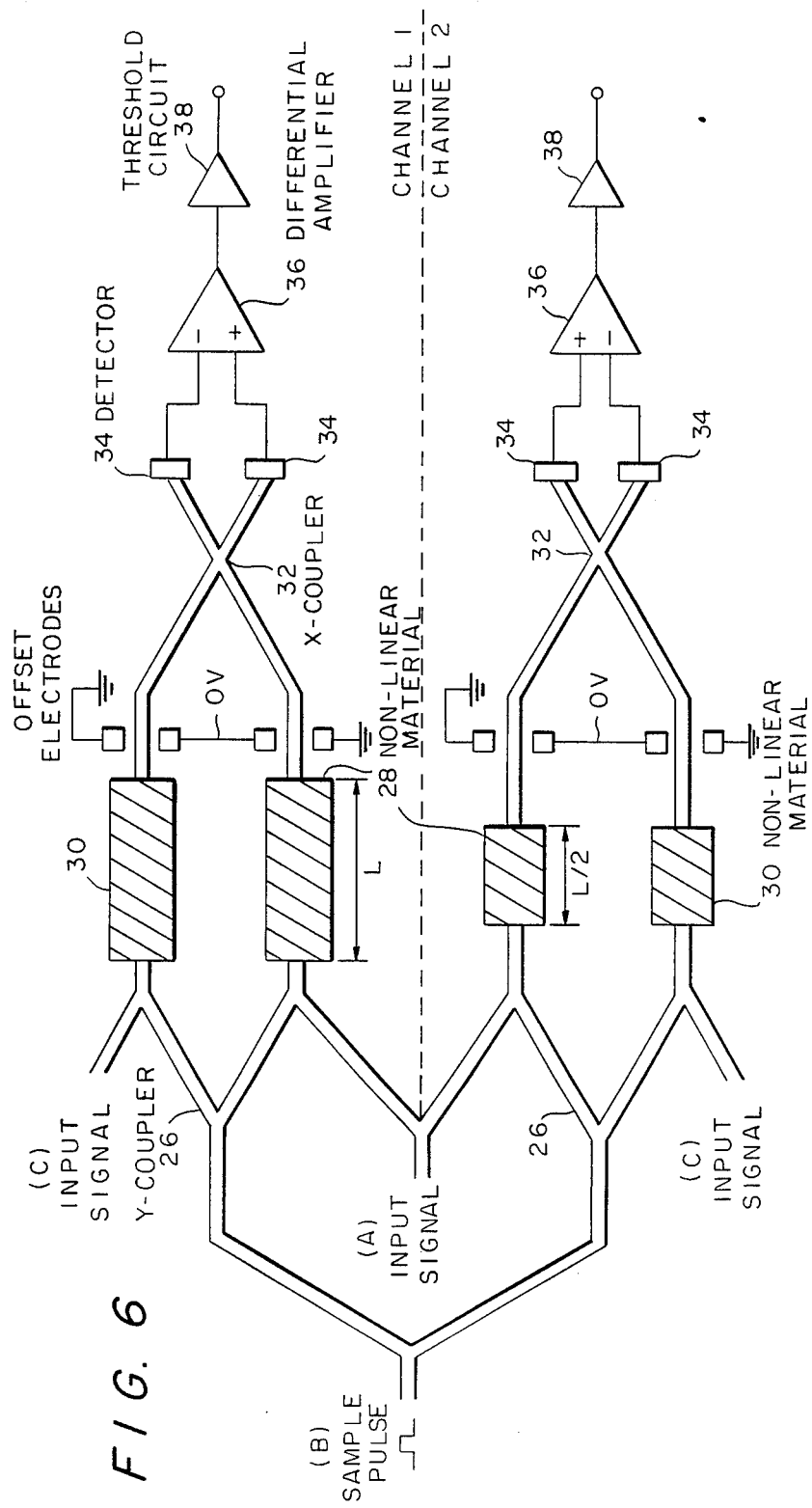
FIG. 6 illustrates a second embodiment of an A/D converter in accordance with the present invention.

A second embodiment of a fully optical A/D converter according to the present invention is shown in FIG. 6 as a two channel device, with each channel having at least two separate inputs. One input (A) is the optical signal to be converted and the other input (B) is a sampling pulse. The sampling pulse is split in two by a Y-coupler 26 to pass through equal two paths of non-linear materials 28 and 30. The split sampling pulse is recombined interferometrically with a 50—50 combiner or X-coupler 32. With no optical signal at input A, the two paths for the sampling pulse are equal, i.e., all the phase delays are balanced. Thus, the two detectors 34 will see equal amounts of light and the output from the differential amplifier 36 will be zero. When an optical signal is present at input A, it will travel only through the path containing the non-linear material 28, thereby changing the index of refraction of the non-linear material 28 to produce a phase shift in the sampling pulse travelling through that path. The phase shift in the sampling pulse causes a change in the intensity of light detected by the detectors 34, the difference of which is determined by the differential amplifier 36. The phase shift, and thus the output of the differential amplifier 36, is directly related to the instantaneous amplitude of the input optical signal. The input signal is divided equally by the X-coupler 32 to avoid affecting the differential output. As both the sampling pulse and the signal pulse are optical, the "walk off" problem associated with electro-optic A/D converters is avoided. As with the first embodiment, the length of the non-liner material is varied in each of the channels of the A/D in order to obtain the desired bit resolution. Offset electrodes are also provided to induce a desired phase offset.

In the embodiment shown in FIG. 6, it is also possible to provide each channel of the A/D with a second signal input (C). The two inputs preferably have different polarizations or wavelengths so as to separate the two signals. Thus, a differential between two input signals can be determined.

The invention has been described in detail with particular reference to certain preferred embodiments thereof, but it will be understood that variations and modifications can be made within the spirit and scope of the invention. For example, it will be understood that conventional integrated optics techniques may be used to form the various components (such as modulators, waveguides and couplers) illustrated on a substrate surface.

What is claimed is:

1. An optical analog-to-digital converter including an plurality of conversion channels, each of said channels comprising:
   a. an interferometer including first and second arms and first and second output ports, said first arm including a non-linear optical material which phase shifts a first optical signal passing through said first arm based on an intensity of light passing through said first arm;
   b. means for applying a second optical signal to said interferometer such that said second optical signal is divided between and passes through said first and second arms;
   c. first and second detectors for detecting an output signal from said first and second output ports respectively; and
   d. a differential circuit coupled to said first and second detectors for generating a digital signal dependent upon the phase difference between output signals from said first and second output ports detected by said first and second detectors.

2. An analog-to-digital converter as claimed in claim 1, further comprising a threshold circuit coupled to said differential circuit.

3. An analog-to-digital converter as claimed in claim 1, wherein said second arm includes an optical waveguide and bias electrodes adjacent said optical waveguide.

4. An analog-to-digital converter as claimed in claim 1, wherein said non-linear material comprises a material embedded into an optical waveguide of said first arm.

5. An analog-to-digital converter as claimed in claim 4, wherein said non-linear material comprises a multi-quantum well structure built into said optical waveguide which comprises a Group III–V semiconductor.

6. An analog-to-digital converter as claimed in claim 1, wherein said non-linear material comprises a non-linear organic material laid over an optical waveguide of said first arm.

7. An analog-to-digital converter as claimed in claim 1, wherein the length of said non-linear optical material provided in said first arm of said interferometer varies for each of said channels.

8. An analog-to-digital converter as claimed in claim 1, further comprising a Mach-Zehnder modulator coupled to an input of said interferometer to convert an analog electrical signal to said second optical signal.

9. An analog-to-digital converter as claimed in claim 1, wherein said interferometer further comprises an X-coupler coupled between said first and second arms and said first and second output ports.

10. An analog-to-digital converter including a plurality of conversions channels, each of said channels comprising:
    a. first means for dividing an optical signal along first and second optical paths;
    b. second means for altering the phase of an optical signal traveling along said first optical path based on an intensity of light traveling along said first optical path to produce a phase altered optical signal;
    c. third means for determining the difference in phase between said phase altered optical signal and a signal provided along said second optical path; and
    d. fourth means for providing a digital signal dependent upon said phase difference.

11. An analog-to-digital converter as claimed in claim 10, wherein said second means comprises an optical non-linear material.

12. An analog-to-digital converter as claimed in claim 11, wherein said third means comprises an optical coupler having first and second outputs corresponding to said first and second optical paths, first and second detectors for receiving output signals from said first and second outputs, and a differential amplifier coupled to said first and second detectors.

13. An optical analog-to-digital converter including a plurality of conversion channels, each of said channels comprising:
    a. an interferometer having first and second arms, each of said arms including a non-linear material having the same length for a given channel;
    b. first means for applying an optical signal to said first arm of said interferometer;
    c. second means for dividing and passing an optical sampling signal through said first and second arms of said interferometer; and
    d. means for determining the phase shift between the portion of said optical sampling signal passing through said first arm and the portion of said optical sampling signal passing through said second arm.

14. An optical analog-to-digital converter as claimed in claim 13, wherein said non-linear material is embedded in a waveguide of said first and second arms of said interferometer.

15. An optical analog-to-digital converter as claimed in claim 14, wherein said non-linear material comprises a quantum well structure built into said waveguide which comprises a Group III–V semiconductor.

16. An optical analog-to-digital converter as claimed in claim 13, wherein said non-linear material covers a waveguide of said first and second arms.

17. An optical analog-to-digital converter as claimed in claim 13, wherein said means for determining the phase shift comprises (i) an optical coupler attached to said first and second arms, said optical coupler having first and second output ports; (ii) first and second detectors respectively coupled to said first and second output ports; (iii) a differential circuit coupled to said first and second detectors; and (iv) a threshold circuit coupled to said differential circuit.

18. An optical analog-to-digital converter as claimed in claim 13, wherein said non-linear optical material has a different length in each of said plurality of channels.

19. A method of generating a digital signal comprising the steps of:

a. dividing a first optical signal along first and second optical paths in a plurality of conversion channels;
b. altering the phase of a second optical signal traveling along said first optical path based on an intensity of light traveling along said first optical path to produce a phase altered optical signal;
c. determining the difference in phase between said phase altered optical signal and a third optical signal provided along said second optical path; and
d. generating a digital signal dependent upon said phase difference.

20. A method as claimed in claim 19, wherein a non-linear optical material is provided along said first optical path to alter the phase of said second optical signal.

21. A method of generating a digital signal, said method comprising the steps of:
a. applying an optical signal to a first arm of a two arm interferometer, each arm of said interferometer including a non-linear material having the same length;
b. dividing and passing an optical sampling signal through said first arm and a second arm of said interferometer; and
c. determining the phase shift between the portion of said optical sampling signal passing through said first arm and the portion of said optical sampling signal passing through said second arm.

* * * * *